United States Patent [19]

Chappell et al.

[11] Patent Number: 4,622,889

[45] Date of Patent: Nov. 18, 1986

[54] PERCOLATOR INCLUDING PUMP TYPE DISPENSER

[75] Inventors: William A. Chappell, Raytown; David T. Higgins, Lee's Summit; Michael D. Reynolds; William J. Tweed, both of Kansas City, all of Mo.

[73] Assignee: Rival Manufacturing Company, Kansas City, Mo.

[21] Appl. No.: 807,283

[22] Filed: Dec. 10, 1985

[51] Int. Cl.⁴ .............................................. A47J 31/00
[52] U.S. Cl. ....................................... 99/312; 99/280; 222/209
[58] Field of Search ................ 99/279, 280, 281, 282, 99/283, 287, 288, 310, 311, 312, 313, 314, 315, 316; 426/433; 222/131, 209, 383

[56] References Cited

U.S. PATENT DOCUMENTS

3,129,318 4/1964 Morrison .
3,905,520 9/1975 Nishioka .
4,174,053 11/1979 Shimizu .
4,344,548 8/1982 Frazier .
4,359,174 11/1982 Ikunosuke et al. .
4,512,246 4/1985 Chappell et al. ...................... 99/312

Primary Examiner—Billy J. Wilhite
Attorney, Agent, or Firm—Willian Brinks Olds Hofer Gilson & Lione Ltd.

[57] ABSTRACT

A percolator/dispenser is disclosed which includes an insulated container having a hinged lid. A percolator heater tube and basket are mounted inside the container, and a manually operated pressure pump is included in the lid of the container. This pressure pump operates to pump air from outside the container to the inside of the container when operated. A discharge spout is movable between a vented position, a pump position, and a sealed position. A pressure lock system prevents the spout from being moved from the sealed position to the pump position when excessive pressure is present within the container. A lid stop system prevents the lid from being closed when the spout is in the pump position. A lid lock system prevents the lid from being opened when the container is pressurized.

23 Claims, 22 Drawing Figures

FIG. 10 (PERC.)

FIG. 14
FIG. 15
FIG. 16 (PERC.)

FIG. 17

PERCOLATOR INCLUDING PUMP TYPE DISPENSER

BACKGROUND OF THE INVENTION

This invention relates to improvements to a percolator including a pump type dispenser, of the general type shown in U.S. Pat. No. 4,512,246, assigned to the assignee of the present invention.

As explained in the above-identified U.S. patent, numerous difficulties are encountered when a percolator is integrated with a pressure type pump. A percolator generates steam and therefore elevated pressures in use and must be vented in order to prevent the build up of excessive pressures. On the other hand, pressure pumps rely on pressure build up to dispense liquid. The above-identified U.S. Pat. No. 4,512,246 discloses two separate dispensers, both of which include solutions to the venting/sealing problem.

The present invention is directed to further improvements in dispensers which include both percolators and pumps for dispensing percolated liquid.

SUMMARY OF THE INVENTION

The following detailed discussion will define in considerable detail a number of separate improvements, which can be used either alone or together to enhance operation of a percolator which includes a pump type dispenser.

According to a first feature of this invention, a dispenser of the general type described above which includes a valve movable between a vent position, a dispensing position, and a sealed position is provided with means for preventing movement of the valve from the sealed position to the pump position when the dispenser is pressurized excessively. In practice, it has been found that if a vessel is pressurized when the valve is moved from the sealed position to the pump position, internal pressure in the vessel can cause the inadvertent pumping of liquid out of the vessel. This feature of the invention overcomes this problem by preventing movement of the valve from the sealed position to the pump position when the vessel is pressurized. The preferred embodiment described below is provided with a pressure relief position which automatically reduces pressure in the vessel when the valve is in an intermediate position between the sealed position and the pump position.

According to a second feature of this invention, a dispenser of the general type described above is provided with means for preventing the closure of the lid when the valve is in the pump position. An attempt to close the lid with the valve in the pump position can result in the unintended dispensing of liquid due to pressurization of the vessel caused by a closure of the lid. The preferred embodiment described below overcomes this problem by providing a lid stop which prevents the lid from being closed when the valve is in the pump position.

According to a third feature of this invention, a dispenser of the general type described above is provided with means for preventing the lid from being opened when the vessel is pressurized. An undesirable and abrupt release of pressure is possible if the lid of the vessel is opened while the vessel is pressurized. The preferred embodiment described below provides an array of interlocking staples and locking fingers which are so arranged that pressure inside the vessel effectively prevents the lid from being opened.

The improvements of this invention cooperate to provide a dispenser which is more easily used by the consumer and which is more nearly fool proof in operation. The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
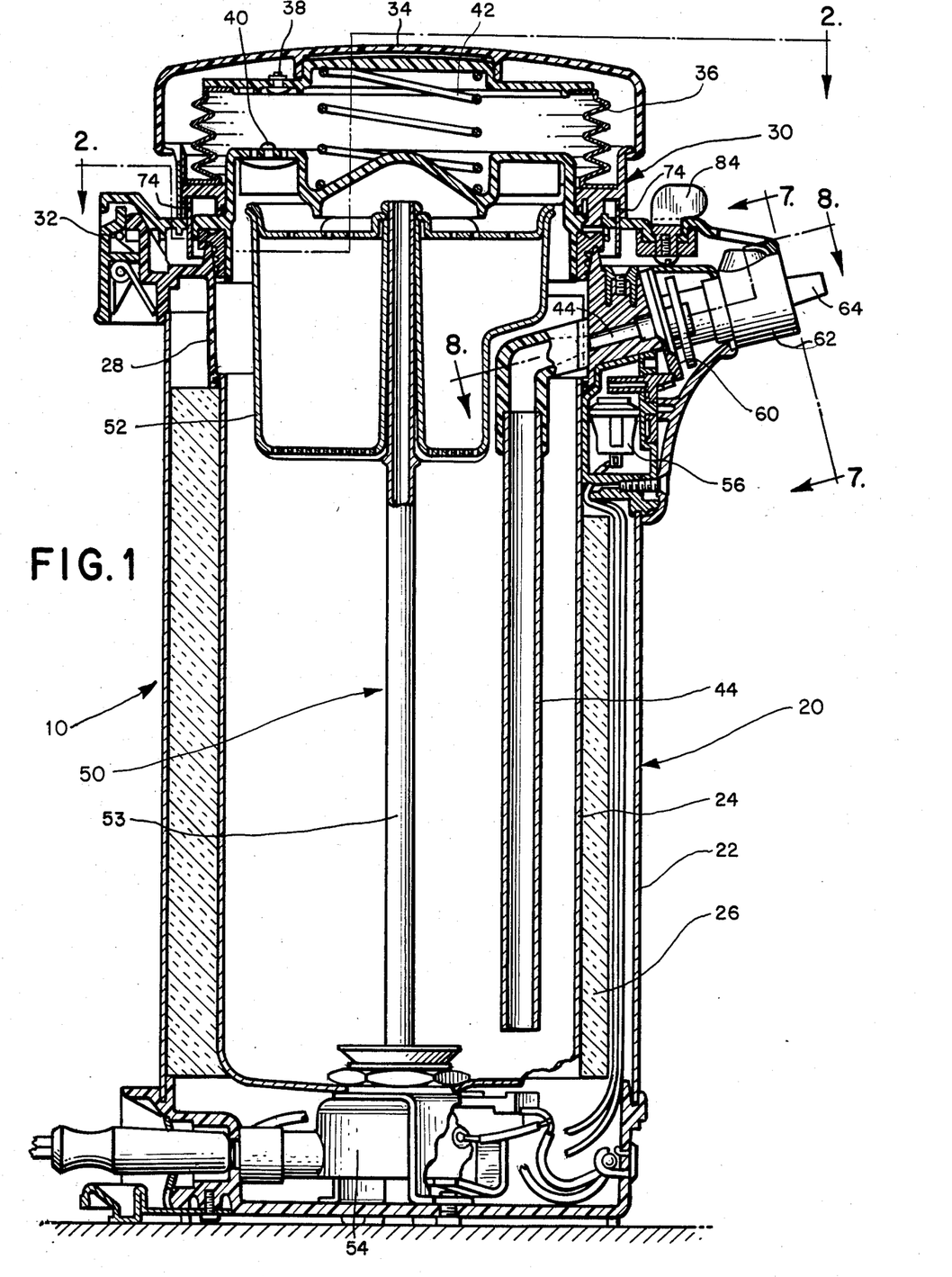
FIG. 1 is a cross-sectional view of a dispenser which incorporates a presently preferred embodiment of this invention.

Turning now to the drawings, FIG. 1 shows a longitudinal sectional view through a presently preferred embodiment 10 of the dispenser of this invention. As shown in FIG. 1, this embodiment 10 includes a container 20 which includes an outer cylindrical wall 22 and an inner vessel 24. A layer of a suitable insulation 26 is interposed between the outer wall 22 and the inner vessel 24. A rigid ring 28 of a material such a polycarbonate interconnects the upper ends of the outer wall 22 and the inner vessel 24 and provides a mounting structure for remaining components of the container 20.

A lid 30 is pivotably mounted to the ring 28 by a hinge 32. The lid 30 serves to seal the inner vessel 24 when in the closed position shown in FIG. 1. A cap 34 is mounted to the lid 30, and the cap 34 can be moved axially as described below. A bellows 36 extends between the cap 34 and the lid 30 to seal an interior region under the cap 34. A first valve 38 acts as a one-way valve to control the admission of air into the region bounded by the bellows 36. A further valve 40 is mounted in the lid 30 to control the admission of air from the region bounded by the bellows 36 into the interior of the inner vessel 24. A coil spring 42 biases the cap 34 into the upper position shown in FIG. 1. A pump tube 44 is mounted to the ring 28 to extend to a point near the bottom of the inner vessel 24. A vent tube 46 is also mounted to the ring 28 and communicates with an upper portion of the inner vessel 24. A rotary valve 60 is mounted to the ring 28 and is connected to a spout 62. The spout 62 defines an external handle 64, and a fastener 66 mounts the valve 60 to the ring 28 for rotation. When the valve 60 is rotated so as to interconnect this spout 62 with the pump tube 44, downward pressure on the cap 34 pumps air into the inner vessel 24, thereby pushing liquid up the pump tube 44 and of the spout 62.

A percolator assembly 50 is mounted in the container 20. This percolator assembly 50 includes a perforated basket 52 adapted to contain coffee grounds or the like. The perforated basket 52 is supported by a conduit 53 which is supported at its lower end in a heater 54. When the heater 54 is activated, heated liquid is forced up the conduit 53. This heated liquid splashes off of the under side of the lid 30 and then percolates down through the perforated basket 52. An interlock switch 56 is mounted to the ring 28. This switch 56 cooperates with the valve 60 to ensure that no electrical power is supplied to the heater 54 unless the valve 60 is rotated to a vent position, in which the spout 62 is aligned with the vent tube 46.

The foregoing description of the container 20 is related to features of the container 20 which are described in greater detail in U.S. Pat. No. 4,512,246. This patent is hereby incorporated by reference for its teaching of the structure of the container 20, and in particular for its teaching of the operation of the interlock switch 56, as shown particularly in FIGS. 8, 8a, 9, 9a, 10, 10a and 13 of the '246 patent.

According to this invention, a number of improvements are provided to the dispenser shown in U.S. Pat. No. 4,512,246. The first of these improvements is a lid lock which provides particular advantages in terms of both sealing the inner vessel 24 properly and preventing the lid 30 from being opened when the inner vessel 24 is pressurized.

Figure 2:
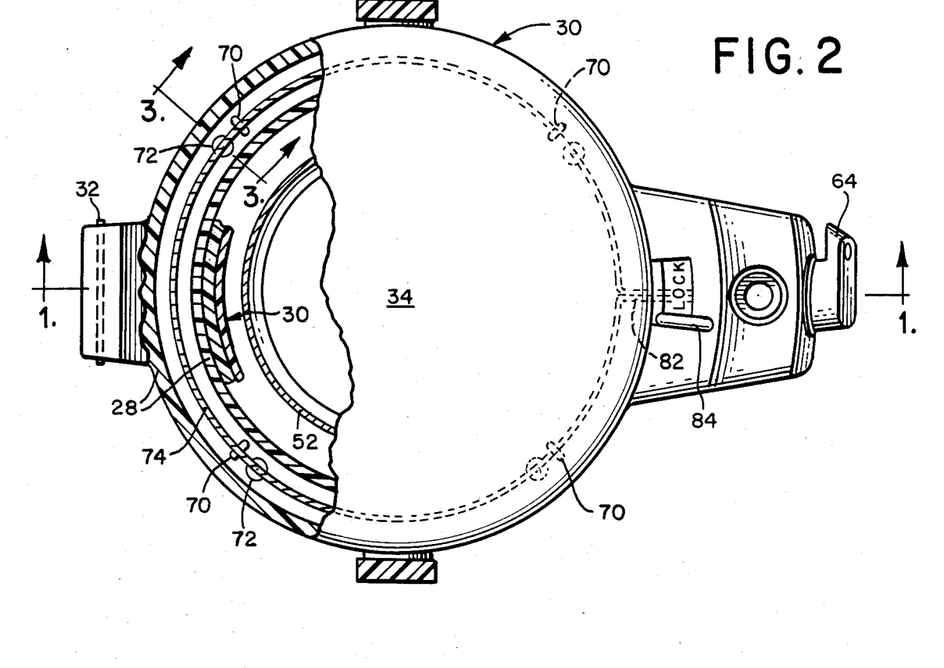
FIG. 2 is a cross-sectional view taken along line 2—2 of FIG. 1.
Figures 3, 4:
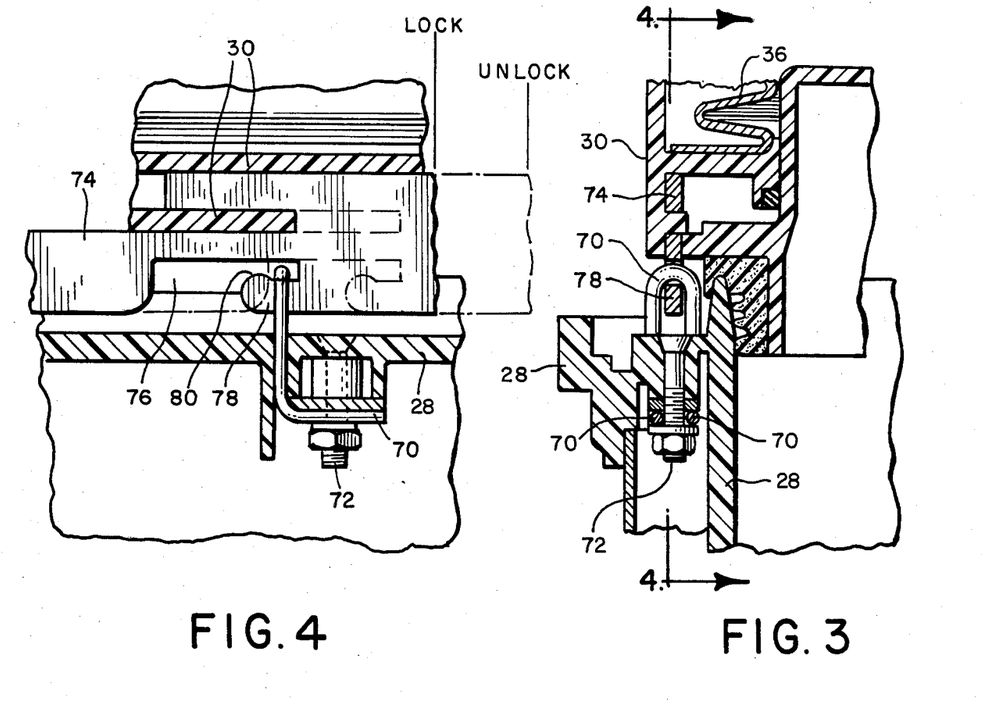
FIG. 3 is a cross-sectional view taken along line 3—3 of FIG. 2.
FIG. 4 is a cross-sectional view taken along line 4—4 of FIG. 3.
Figures 5, 6, 7, 10:
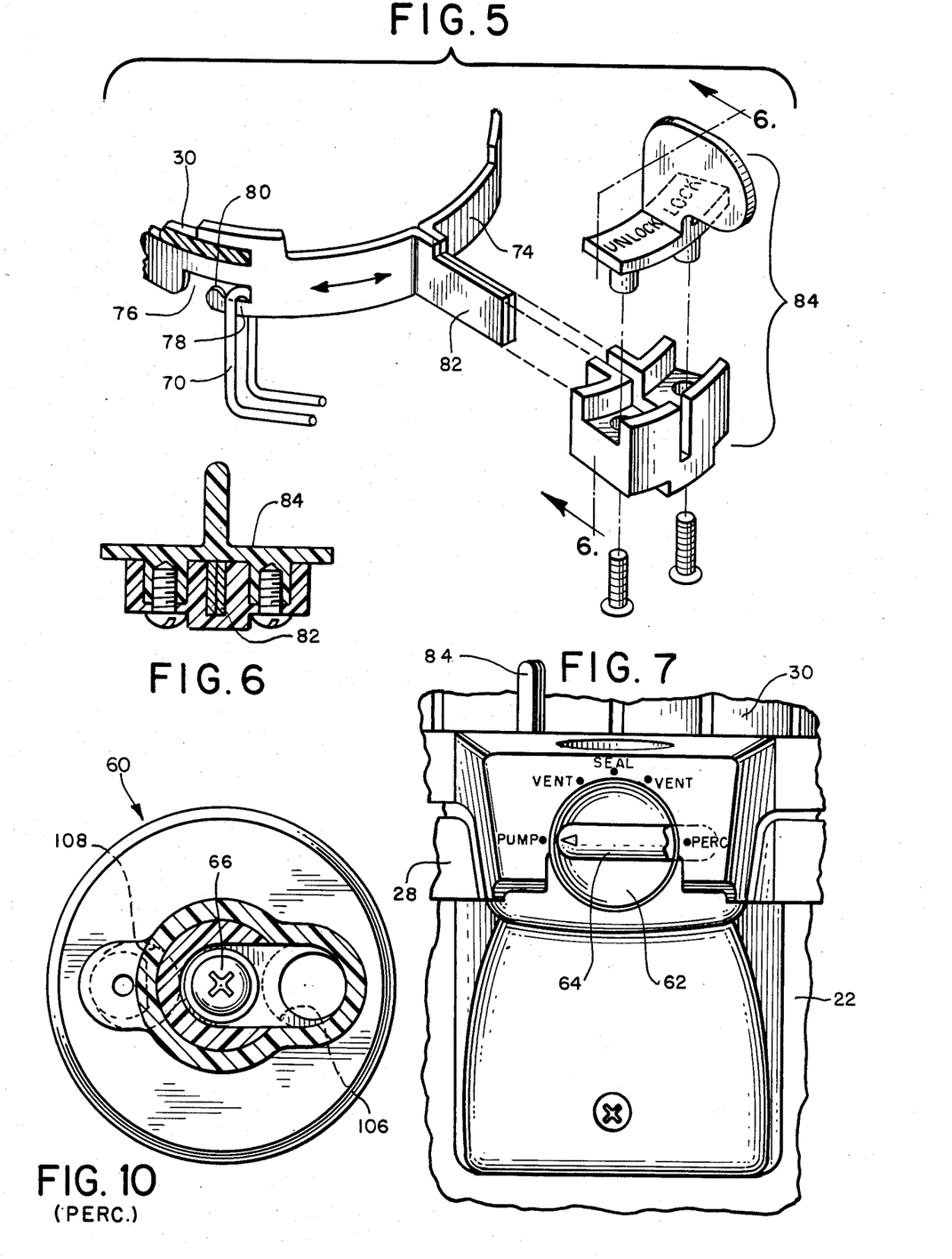
FIG. 5 is an exploded perspective view of portions of the lid lock of the embodiment of FIG. 1.
FIG. 6 is a cross-sectional view taken along line 6—6 of FIG. 5.
FIG. 7 is a partial elevational view of the spout region of the embodiment of FIG. 1.
FIG. 10 is a cross-sectional view taken along line 10—10 of FIG. 8.

The lid lock is shown in FIGS. 2-6. As shown in FIG. 2, a set of four staples 70 are rigidly mounted to the ring 28. These four staples 70 extend toward the lid 30 and are separated from one another by approximately 90 degrees. As shown in FIGS. 3 and 4, each of the staples 70 is secured to the ring 28 by a suitable fastener 72. A lock ring 74 is mounted in the lid 30 for limited rotation. This lock ring 74 defines a set of four cut outs 76, each of which is aligned with a respective one of the staples 70. Each of the cut outs 76 is bounded in part by a locking finger 78 which terminates in a raised surface 80. The lock ring 74 includes a radially extending tab 82 which is rigidly secured to a protruding actuator 84 (FIGS. 2, 5 and 6). An operator can rotate the lock ring 74 between a locked position, in which the locking fingers 78 capture the respective staples 70, and an unlocked position, in which the staples 70 are free to move out of the respective cut outs 76.

The raised surfaces 80 of the locking fingers 78 operate to prevent movement of the lock ring 74 from the closed position to the open position unless the lid 30 moves toward the inner vessel 24 by a sufficient amount to allow the raised surfaces 80 to clear the staples 70. In the event the inner vessel 24 is pressurized and an attempt is made to move the lock ring 74 from the locked to the unlocked position, the raised surfaces 80 effectively prevent movement of the lock ring 74 to the unlocked position. In this way, the staples 70 cooperate with the lock ring 74 to prevent the lid 30 from being opened when the inner vessel 24 is pressurized. In addition, because the staples 70 are spaced evenly around the perimeter of the lid 30, the staples 70 and the lock ring 74 provide a distributed hold down force for the lid 30.

Figure 12:
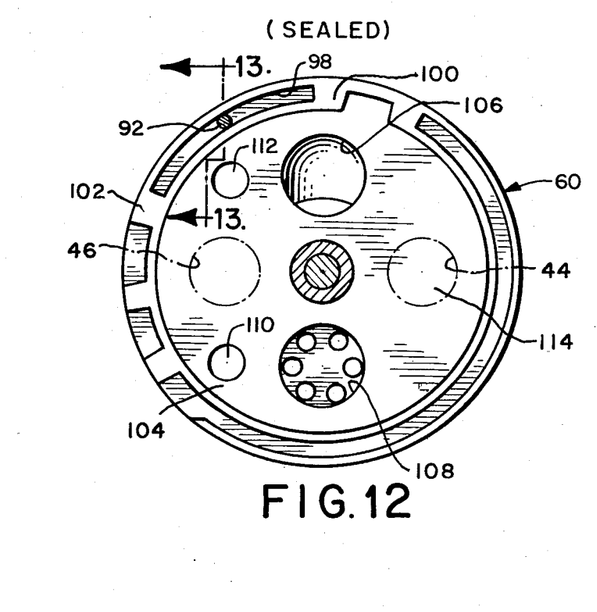
FIG. 12 is a cross-sectional view corresponding to FIG. 11 showing the valve plate in the sealed position.
Figure 13:
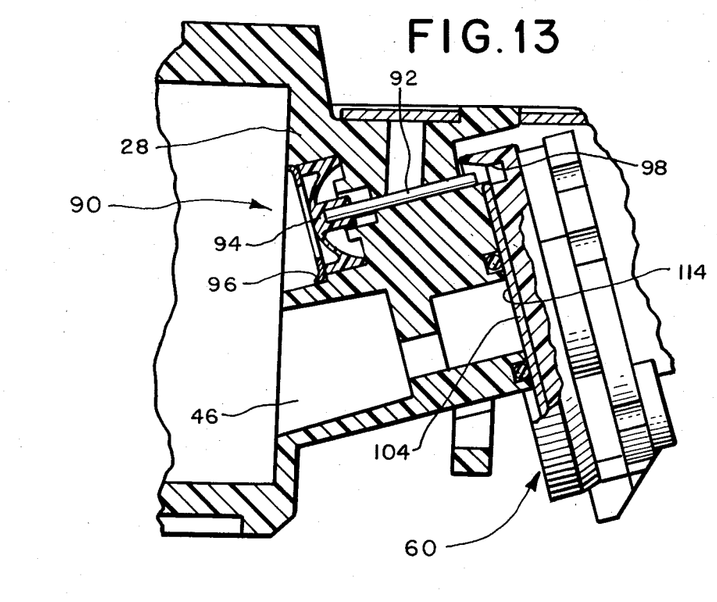
FIG. 13 is a cross-sectional view taken along line 13—13 of FIG. 12.

Turning now to FIGS. 12 and 13, the embodiment 10 also includes a pressure lock assembly 90 which limits movement of the valve 60 when the inner vessel 24 is pressurized. This pressure lock assembly 90 includes a lock pin 92 which is mounted for axial movement in the ring 28. The lock pin 92 is coupled to a resilient diaphragm 94 which is held in place in a well defined by the ring 28 by means of a retaining washer 96. FIG. 13 shows the position of the lock pin 92 when a differential pressure across the diaphragm 94 is less than about one-quarter PSI. When the differential pressure across the diaphragm 94 exceeds about one-quarter PSI, the diaphragm 94 moves the lock pin 92 to an extended position, in which the lock pin 92 protrudes into the valve 60.

As shown in FIG. 12, the portion of the valve 60 adjacent the ring 28 defines an arcuate groove 98 which is bounded at one end by first lug 100 and at the other end by a second lug 102. This arcuate groove 98 is sized to receive the extending end of the lock pin 92. The lugs 100, 102 engage the extended end of the lock pin 92 to limit rotation of the valve 60.

Figures 8, 9, 11:
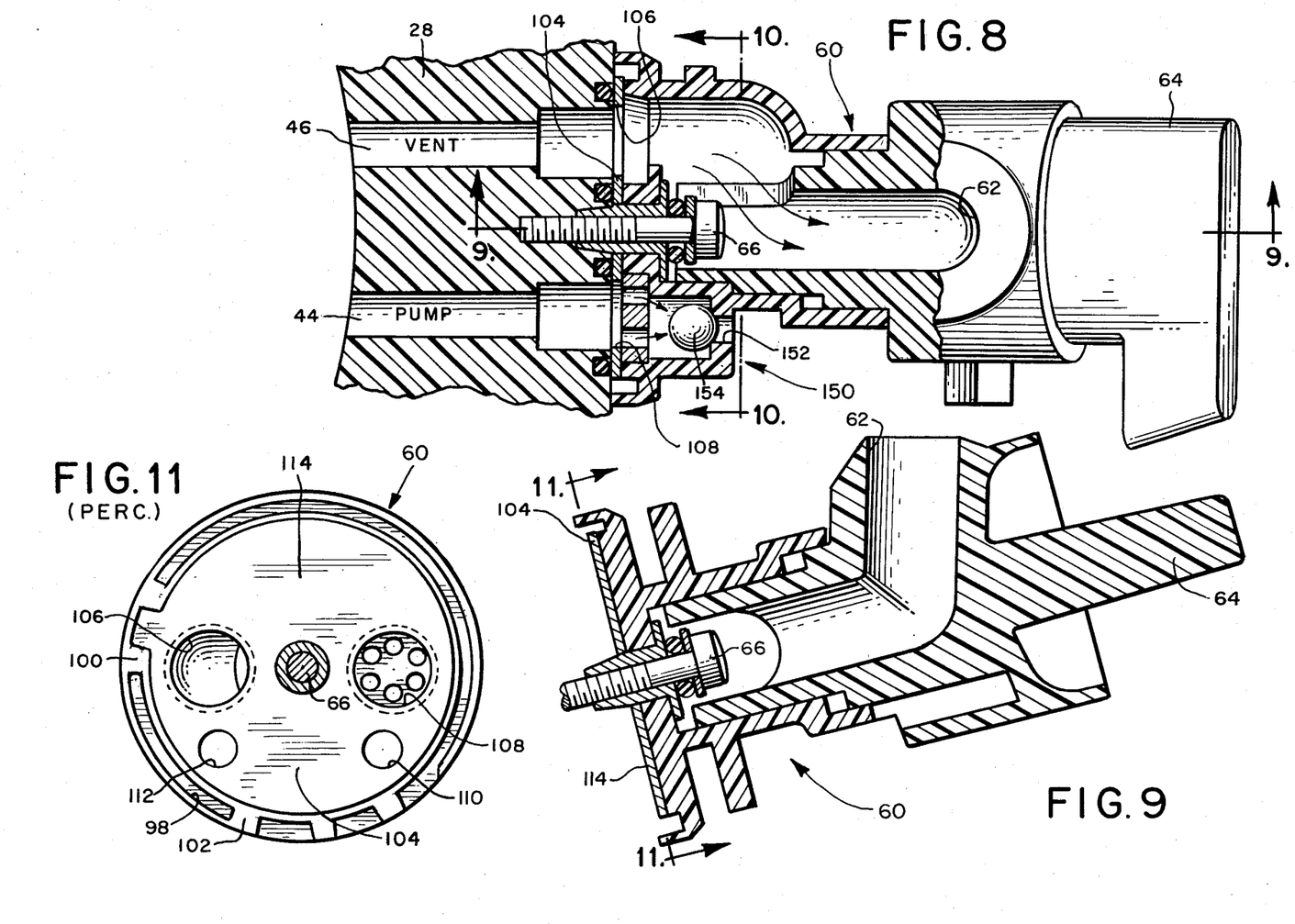
FIG. 8 is a cross-sectional view taken along line 8—8 of FIG. 1.
FIG. 9 is a cross-sectional view taken along line 9—9 of FIG. 8.
FIG. 11 is a cross-sectional view taken along line 11—11 of FIG. 9.
Figure 11A:
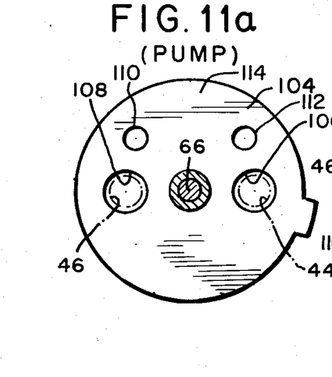
FIGS. 11a through 11e are cross-sectional views corresponding to FIG. 11 showing the valve plate in the pump, pressure relief, sealed, pressure relief, and perc positions, respectively.
Figure 11B:
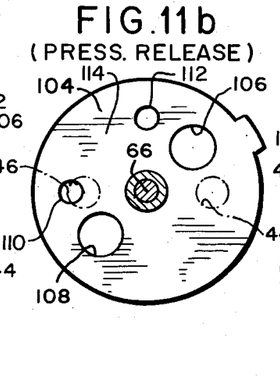
Figure 11C:
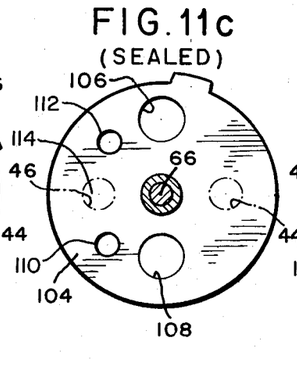
Figure 11D:
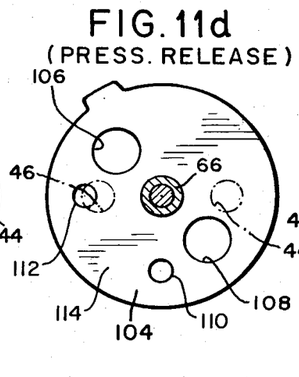
Figure 11E:
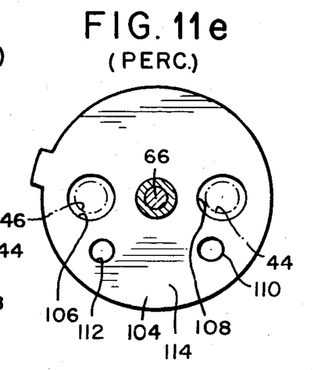

As shown in FIGS. 11-12, the valve 60 includes a valve plate 104 which defines four openings. The first is a spout opening 106 which is interconnected with the spout 62. The second is a check valve opening 108, which will be described below in connection with FIG. 8. First and second pressure relief openings 110, 112 are included, and a seal surface 114 is provided between the first and second relief openings 110, 112.

As shown in FIGS. 11a-11e, the valve plate 104 can be rotated between five basic positions. In the pump position (FIG. 11a) the spout opening 106 is aligned with the pump tube 44 and liquid moving up the pump tube 44 is free to move out of the spout 62. In this position the check valve opening 108 is aligned with the vent tube 46. In the position shown in FIG. 11b the first pressure relief opening 110 is aligned with the vent tube 46 to allow pressure within the inner vessel 24 to be vented. In the third position (FIG. 11c) the seal surface 114 is aligned with the pump tube 44 and the vent tube 46 and the inner vessel 24 is sealed. In the fourth position (FIG. 11d) the second pressure relief opening 112 is aligned with the vent tube 46, again allowing pressure within the inner vessel 24 to be relieved. In the fifth position the spout opening 106 is aligned with the vent tube 46 to provide free venting of the interior of the inner vessel 24 during operation of the percolator assembly 50.

The arcuate groove 98 is arranged such that the lock pin 92 is free to extend into the arcuate groove 98 near the center of the arcuate groove 98 when the valve 60 is in the sealed position. As long as the pressure of the inner vessel 24 is more than one-quarter PSI above atmospheric pressure, the lock pin 92 will extend into the arcuate groove 98. If the valve 60 is rotated in either direction, one of the lugs 100, 102 will prevent movement of the valve 100 to either the pump position or the vent position. However, when the lock pin 92 comes into contact with either of the lugs 100, 102, the respective one of the pressure relief openings 110, 112 will be aligned with the vent tube 46, thereby relieving pressure from the inner vessel 24. Once pressure has been equalized across the diaphragm 94, the diaphragm 94 will retract the lock pin 92, thereby freeing the valve 60 for rotation to either the pump or vent position.

As suggested above, problems may be encountered if the valve 60 is moved from the sealed position to the pump position while the inner vessel 24 is pressurized. Pressure in the inner vessel may cause liquid to move up the pump tube 44 and out the spout 62. The pressure lock assembly of this embodiment overcomes this problem by insuring that the valve 60 cannot rotate from the sealed position to the pump position as long as the inner vessel 24 is pressurized.

Figure 14:
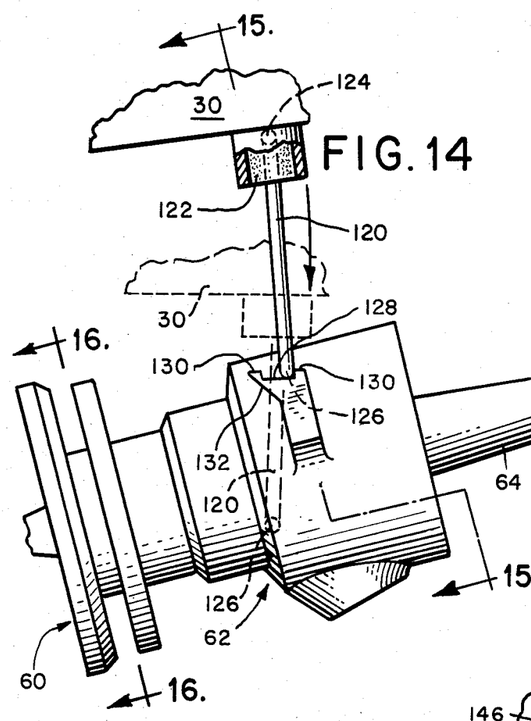
FIG. 14 is a partial side view of portions of the embodiment of FIG. 1 relating to the lid stop feature of this embodiment.
Figure 15:
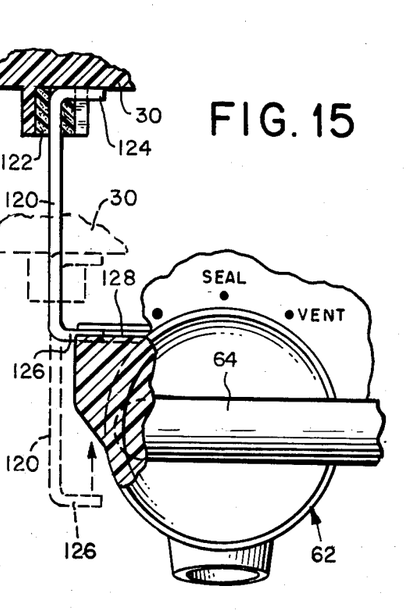
FIG. 15 is a cross-sectional view taken along line 15—15 of FIG. 14.

Turning now to FIGS. 14 and 15, the embodiment 10 also includes a lid stop assembly to prevent closure of the lid 30 when the valve 60 is in the pump position. This lid stop assembly includes a stop pin 120 which is mounted to the lid 30 via a resilient rubber bushing 122. This stop pin 120 defines an upper end 124 which bears against the lid 30 and a lower end 126.

The spout 62 defines a stop surface 128 which is bounded at each end by a respective step 130. This stop surface 128 is aligned with the stop pin 120 only when the valve 60 is in the pump position as shown in FIGS. 14 and 15. When the valve 60 is in the pump position and the lid 30 is open, an attempt to close the lid 30 will bring the lower end 126 of the stop pin 120 into abutting contact with the stop surface 128, thereby preventing the lid 30 from closing. The resilient bushing 122 is provided to allow the stop pin 120 to orient itself as necessary to move past the ramp 132 when the lid 30 is opened. When the valve 60 is in the pump position and the lid 30 is closed, the lower end 126 of the stop pin 120 is positioned directly adjacent to the ramp 132. When in this position the lid 30 is opened, the ramp 132 will deflect the stop pin 120 in the bushing 122, thereby allowing the stop pin 120 to move past the stop surface 128.

As pointed out above, if the lid 30 were to be closed with the valve 60 in the pump position, increased pressure in the inner vessel 24 on occasion might force liquid up the pump tube 44 and out the spout 62, thereby inadvertently pumping liquid out of the inner vessel 24. The lid stop assembly overcomes this problem by ensuring that the valve 60 is not in the pump position when the lid 30 is closed.

Figure 16:
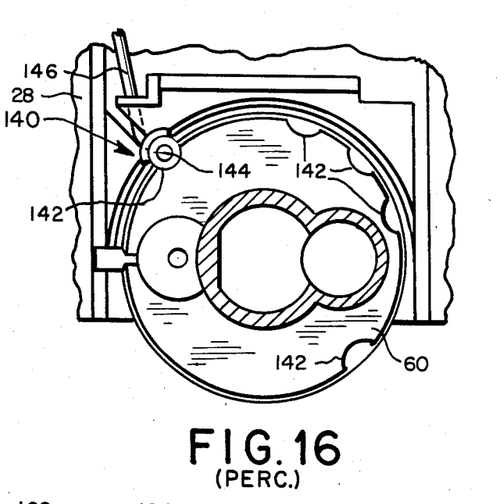
FIG. 16 is a cross-sectional view taken along line 16—16 of FIG. 14.

Turning now to FIG. 16, a detent assembly 140 is provided to index the valve 60 to the five specific positions discussed above. This detent assembly 140 includes a set of five recesses 142 formed in the valve 60. A detent roller 144 is rotatably mounted to the end of a detent spring 146 which is in turn mounted to the ring 28. The spring 146 resiliently biases the roller 144 against the valve 60 and into the recesses 142. The recesses 142 are positioned about the perimeter of the valve 60 such that the detent roller 144 is within one of the recesses 142 for each of the five positions described above.

Turning now to FIG. 8, the valve 60 includes a check valve assembly 150 which is oriented at 180 degrees from the spout opening 106. This check valve assembly 150 is vented to atmosphere via a vent opening 152 and includes a stainless steel ball 154. The weight of the steel ball is selected such that when the pump is not in operation, the check valve assembly 150 continuously vents the inner vessel 24 when the valve 60 is in the pump position. However, an abrupt increase in pressure in the inner vessel 24 caused by operation of the pump forces the ball 154 to seal the vent opening 152, thereby sealing the inner vessel 24 and ensuring that pressurization of the inner vessel 24 forces liquid up the pump tube 44 and out the spout 62.

Figure 17:
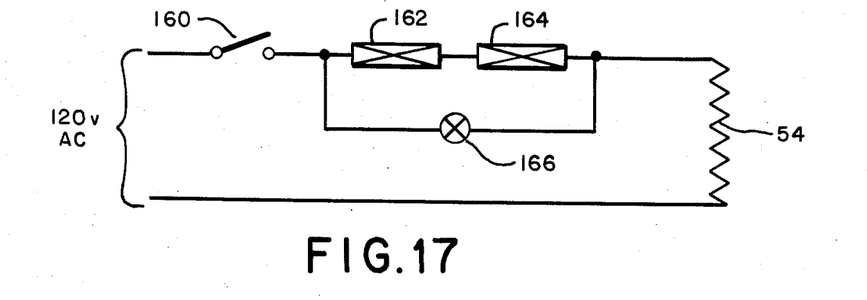
FIG. 17 is a general electrical schematic diagram of the circuitry of the embodiment of FIG. 1.

Turning now to FIG. 17, embodiment 10 includes two separate thermostats 162, 164. These thermostats 162, 164 are connected in parallel with a pilot lamp 166. A manually operated switch 160 is used to energize or deenergize the heating element 54. In this embodiment the primary thermostat 162 is mounted to the inner vessel 24 to measure the temperature of liquid contained in the inner vessel 24. The primary thermostat 162 is used in normal control of the heating element 54 during percolator operation. The second thermostat 164 is mounted to sense the temperature of the heating well of the heater 54. The second thermostat 164 is provided with a higher switching temperature than the primary thermostat 162 and operates to turn off the heater 54 in the event the inner vessel 24 is empty and the heater 54 reaches an undesirably high temperature.

It will be apparent to those skilled in the art that a wide variety of materials may be used in the embodiment described above. However, merely for purposes of illustration and without in any way intending to limit the scope of this invention, the following details of construction are provided. In this embodiment the diaphragm 90 is formed of an ethylene propylene (EPDM) having a durometer of about 50–60 (Shore A). A similar material is suitable for the lid seal. The ring 28 and lid 30 can suitably be formed from a polycarbonate such as LEXAN. The valve 60 and the spout 62 can suitably be formed from an acetal copolymer such as Celcon-Kematal (M90-30 grade). Preferably, all metal elements are formed of a stainless steel, and all plastic materials should be FDA certified for use with food dispensing products.

From the foregoing, it should be apparent that an improved percolator including a pump type dispenser has been described. The various improvements described above are well suited for use in combination with one another as shown in the attached drawings. However, it should be understood that these improvements can also be used separately. Of course, it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of this invention.

We claim:

1. In a percolator/dispenser of the type comprising a vessel comprising a lid, a percolator assembly inside the vessel, a spout extending between the interior and the exterior of the vessel, and a manually operated pump mounted to the vessel and operative to pump liquid out of the vessel through the spout, the improvement comprising:

a valve;

means for movably mounting the valve to the vessel such that the valve is movable between a vent position, in which the valve vents the interior of the vessel, a pump position, in which the valve directs liquid to the spout, and a sealed position, in which the valve seals the interior of the vessel; and means, coupled to the valve, for preventing movement of the valve from the sealed position to the pump position when the vessel is pressurized excessively.

2. The invention of claim 1 further comprising:

means, coupled to the valve, for preventing movement of the valve from the sealed position to the vent position when the vessel is pressurized excessively.

3. The invention of claim 2 further comprising means for releasing pressure from the vessel when the valve is in a first intermediate position between the sealed position and the pump portion and when the valve is in a second intermediate position between the sealed position and the vent position.

4. The invention of claim 1 wherein the movement preventing means comprises:

a pressure diaphragm mounted to the vessel such that the diaphragm moves in response to pressure changes in the vessel;

a lock member coupled to the diaphragm to move with the diaphragm between a locking position when pressure inside the vessel is excessive and a release position when pressure inside the vessel is less than excessive; and means, included in the valve, for engaging the lock member when the lock member is in the locking position to limit movement of the valve.

5. The invention of claim 1 further comprising means for providing a detent action to locate the valve in the respective positions.

6. The invention of claim 1 wherein the valve comprises a check valve which is normally open to atmosphere to vent the vessel when the valve is in the pump position, but which automatically closes when the pump is operated.

7. In a percolator/dispenser of the type comprising a vessel comprising a lid, a percolator assembly inside the vessel, a spout extending between the interior and the exterior of the vessel, and a manually operated pump mounted to the vessel and operative to pump liquid out of the vessel through the spout, the improvement comprising:

a valve;

means for movably mounting the valve to the vessel such that the valve is movable between a vent position, in which the valve vents the interior of the vessel, a pump position, in which the valve directs liquid to the spout, and a sealed position, in which the valve seals the interior of the vessel; and means, coupled to the valve, for preventing closure of the lid when the valve is in the pump position.

8. The invention of claim 7 wherein the closure preventing means comprises:

a blocking member mounted to the lid; and a stop mounted to move with the valve and positioned to stop movement of the blocking member when the valve is in the pump position and the lid is moved toward the closed position, thereby preventing closure of the lid.

9. The invention of claim 8 wherein the blocking member is resiliently mounted to the lid, and wherein the stop defines a ramp surface positioned to deflect the blocking member around the stop member when the valve is in the pump position and the lid is opened.

10. The invention of claim 7 further comprising means for providing a detent action to locate the valve in the respective positions.

11. The invention of claim 7 wherein the valve comprises a check valve which is normally open to atmosphere to vent the vessel when the valve is in the pump position, but which automatically closes when the pump is operated.

12. In a percolator/dispenser of the type comprising a vessel comprising a lid, a percolator assembly inside the vessel, a spout extending between the interior and the exterior of the vessel, and a manually operated pump mounted to the vessel and operative to pump liquid out of the vessel through the spout, the improvement comprising:

a set of first locking members mounted on the lid and arranged around the periphery of the lid;

a set of second locking members mounted on the vessel, each aligned with a respective one of the first locking members;

means for moving one of the sets of locking members as a unit to selectively engage and disengage the locking members, thereby selectively locking and unlocking the lid and the vessel; and means for preventing disengagement of the two sets of locking members when excessive pressure is present in the vessel.

13. The invention of claim 12 wherein the set of first locking members comprises a set of locking fingers mounted to a locking ring; wherein the set of second locking members comprises a plurality of staples, each mounted to the vessel to extend toward the lid; wherein the moving means comprises a handle mounted to the locking ring; and wherein the preventing means comprises a raised portion on at least some of the locking fingers, each raised portion shaped to engage the respective staple to force the lid toward the vessel as the locking fingers are moved out of the respective staples, past the raised portions.

14. In a percolator/dispenser of the type comprising a vessel comprising a lid, a percolator assembly inside the vessel, a spout extending between the interior and the exterior of the vessel, and a manually operated pump mounted to the vessel and operative to pump liquid out of the vessel through the spout, the improvement comprising:

a rotary valve;

means for rotatably mounting the valve to the vessel such that the valve is rotatable between a vent position, in which the valve vents the interior of the vessel, a pump position, in which the valve directs liquid to the spout, and a sealed position, in which the valve seals the interior of the vessel, said sealed position located between the pump position and vent positions, said valve operating to release pressure from the vessel when in either of two pressure release positions, one located on either side of the sealed position;

means for defining an arcuate slot in the valve;

a locking pin slidably mounted in the vessel to engage the arcuate slot when in an extended position and to release the arcuate slot when in a retracted position; and means for moving the locking pin to the extended position when the vessel is pressurized and for moving the locking pin to the retracted position when the vessel is unpressurized;

said locking pin and slot situated such that the pin, when in the extended positions, prevents movement of the valve to either the pump or the vent position, yet allows movement of the valve to either of the pressure release positions.

15. The invention of claim 14 wherein the locking pin moving means comprises a diaphragm mounted to the vessel and coupled to the locking pin.

16. The invention of claim 14 further comprising means for providing a detent action to locate the valve in the respective positions.

17. The invention of claim 14 further comprising:
means, coupled to the valve, for preventing closure of the lid when the valve is in the open position.

18. The invention of claim 17 wherein the closure preventing means comprises:
a blocking member mounted to the lid; and
a stop mounted to move with the valve and positioned to stop movement of the blocking member when the valve is in the pump position and the lid is moved toward the closed position, thereby preventing closure of the lid.

19. The invention of claim 18 wherein the blocking member is resiliently mounted to the lid, and wherein the stop defines a ramp surface positioned to deflect the blocking member around the stop member when the valve is in the pump position and the lid is opened.

20. The invention of claim 14 further comprising:
means for preventing the lid from being opened when the vessel is pressurized.

21. The invention of claim 20 wherein the preventing means comprises:
a set of locking fingers, each defining a respective raised surface; and
a set of staples, each positioned to engage a respective one of the locking fingers;
said raised surfaces positioned such that movement of the raised surfaces past the staples forces the lid towards the vessel.

22. The invention of claim 14 wherein the percolator assembly comprises a heater, and wherein the improvement further comprises a thermostat mounted to the heater to turn off the heater when the heater reaches excessive temperatures indicative of dry operation.

23. The invention of claim 14 wherein the valve comprises a check valve which is normally open to atmosphere to vent the vessel when the valve is in the pump position, but which automatically closes when the pump is operated.

* * * * *